(12) United States Patent
Mills

(10) Patent No.: US 6,552,321 B1
(45) Date of Patent: Apr. 22, 2003

(54) ADAPTIVE SPECTRAL IMAGING DEVICE AND METHOD

(75) Inventor: James P. Mills, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 170 days.

(21) Appl. No.: 09/653,762

(22) Filed: Sep. 1, 2000

(51) Int. Cl.$^7$ .............................................. H01L 27/00
(52) U.S. Cl. .................................. 250/208.1; 250/216
(58) Field of Search .......................... 250/208.1, 226, 250/201.2, 201.4, 201.9, 216; 350/300, 324, 307; 396/79, 80, 82; 359/245, 252, 244

(56) References Cited

U.S. PATENT DOCUMENTS

| | | | |
|---|---|---|---|
| 4,964,701 A | 10/1990 | Dorschner et al. | |
| 5,018,835 A | 5/1991 | Dorschner | |
| 5,093,747 A | 3/1992 | Dorschner | 359/316 |
| 5,126,869 A | 6/1992 | Lipchak et al. | 359/94 |
| 5,278,402 A | * 1/1994 | Wein | 250/201.9 |
| 5,867,264 A | * 2/1999 | Hinnrichs | 356/310 |
| 5,963,682 A | 10/1999 | Dorschner et al. | 385/16 |

OTHER PUBLICATIONS

Martin Vetterli et al., "Wavelets and Subband Coding," Prentice Hall PTR, 1995, pp. 214–223, (Month Unknown).
Michael R. Descour, "Imaging spectrometer captures data in a flash," *Laser Focus World*, Oct. 1997, pp. 107–113.
Harry L. Van Trees, "Detection, Estimation, and Modulation Theory, Part I—Detection, Estimation, and Linear Modulation Theory," John Wiley & Sons, 1968, pp. 290–297, (Month Unknown).
Takayuki Okamoto et al., "Simultaneous Acquistion of Spectral and Spatial Intensity Distribution," *Applied Spectroscopy*, vol. 47, No. 8, 1993, pp. 1198–1202,(Month Unknown).

* cited by examiner

*Primary Examiner*—Que T. Le

(57) ABSTRACT

An adaptive spectral imaging device operable to analyze a scene includes a detector having a detector output signal and an optical system disposed in an optical ray path between the scene and the detector to image the scene onto the detector. A controllable optical disperser is disposed along the optical ray path between the scene and the detector. The controllable optical disperser has a disperser input command signal. A controller has a controller output signal responsive to the detector output signal. The controller output signal is provided to the controllable optical disperser as the disperser input command signal.

18 Claims, 4 Drawing Sheets

ADAPTIVE SPECTRAL IMAGING DEVICE AND METHOD

This invention relates to optical devices and methods and, more particularly, to the spectral analysis of images.

BACKGROUND OF THE INVENTION

The features in a scene may often be analyzed most effectively according to the optical spectra that they produce at various wavelengths, as well as their physical size, shape, and position. Most features have characteristic optical spectra that may be used to distinguish them from other features. The optical spectra vary according to wavelength, so that an array of optical spectra over a range of wavelengths provides a unique signature pattern for the feature of interest.

The human eye integrates these spectra so that it perceives only an averaged color pattern for the feature. The human eye may therefore not be able to spectrally distinguish many types of features, such as a target feature that is painted green from the green of a grassy field in which the object is located. The result is that the target feature is effectively invisible to the naked eye against the background.

On the other hand, a spectrometer produces a spectral pattern of magnitude of the incident optical signal as a function of its wavelength. An imaging spectrometer performs this same function at each location over the field of view of a scene. The optical spectra may be analyzed to distinguish a target feature of interest from the background and, if necessary, to compare the optical spectra of the target feature with known spectral forms to identify the nature of the target feature. For example, a green-painted target feature may be located in a green background because it has a different optical spectrum than does the background. The nature of the target feature may be identified by comparing its target optical spectrum with those in a library of optical spectra to determine whether the target feature is a person clothed in green, a green tree, a green wooden structure, a green metal object, etc. Military seekers may make use of these capabilities to locate and identify camouflaged target features.

One of the problems encountered in the use of imaging spectrometers is that they collect too much data to be processed effectively in real time. For example, an imaging spectrometer with a focal plane array of 500×500 pixels collecting 100 spectral bands 60 times per second with 14 bits of digital resolution has a data rate of 21 gigabits per second. The extraction of useful information typically requires 10 to 100 operations per pixel, for a required operational rate of the data processor of 15–150 giga-operations per second. The computing power now available and which may be expected to be available in the near future cannot support these data processing rates.

To overcome this problem, prior imaging spectrometers have taken several approaches for limiting the data taken. In some cases, only a few selected spectral bands are collected, so that the amount of data to be analyzed is manageable. However, this approach is not fully satisfactory because the portions of the optical spectrum required to distinguish target features from the background may vary widely. For example, distinguishing target features against an earth background and against a water or sky background require the analysis of different portions of the optical spectrum. The limiting of the spectral analysis to a few bands prevents the locating and identification of features over a wide range of conditions. Other approaches involve limiting the spatial extent of the imaged scene or increasing the time taken to collect the data, but these approaches result in lower resolution, lower field of view, and/or slower speed.

There is a need for an improved approach to the spectral analysis of images in order to maintain data analysis rates within the capabilities of available and expected data processors, and also to provide robust analysis capabilities operable over a wide range of conditions. The present invention fulfills this need, and further provides related advantages.

SUMMARY OF THE INVENTION

The present invention provides an adaptive spectral imaging device and a method for adaptively analyzing a scene. This approach permits the analysis of a scene over a full spectral range to locate and identify target features in the scene, while holding the amount of data processing within the capabilities of existing and expected data processors.

In accordance with the invention, an adaptive spectral imaging device operable to analyze a scene comprises a detector such as a focal plane array having a detector output signal, and an optical system disposed in an optical ray path between the scene and the detector. The optical system images the scene onto the detector. A controllable optical disperser is disposed along the optical ray path between the scene and the detector. That is, the optical dispersion of the optical disperser is controllable. The controllable optical disperser is preferably an optical phased array, but could be other types of controllable devices as well. In a typical configuration, the optical system contains a first lens and a second lens, and the controllable optical disperser is positioned between the first lens and the second lens. The controllable optical disperser has a disperser input command signal. A controller has a controller output signal responsive to the detector output signal. The controller output signal is provided to the controllable optical disperser as the disperser input command signal.

In one application, the controller includes a calculational routine that analyzes low-resolution (spatial and spectral) scene information and uses that information to modify (via the adaptive disperser) the spectral and optionally the spatial content of the detected imagery. The modification discards spectral and spatial information that is not relevant to the task being accomplished. This winnowing of information results in much less data to process and thus allows the decisions based upon the spectral content of the scene to be made much more rapidly. An example task of interest is to produce an image that has a high contrast between a camouflaged object and a cluttered natural background. The object might be a tank in the trees or an intruder in the bushes. An example calculational routine is a whitening operation conducted using multiresolution techniques.

Thus, a method for adaptively analyzing a scene comprises the steps of imaging a scene onto a detector so that a ray path from the scene to the detector passes through a controllable optical disperser. The controllable optical disperser is controlled responsive to an output signal of the detector.

Existing imaging spectrometers use a fixed optical disperser, such as a prism or a diffraction grating, whose dispersion characteristics are not controllable. The data analysis attempts to utilize all of the data produced, with the result that there is too much data to be analyzed in real time using available computational capabilities. In the present approach, on the other hand, the optical disperser is controllable so that only the most useful spectral information is gathered and need be processed. The spectral information that is "most useful" depends upon the circumstances. The controller makes that determination based upon the information received from the detector, and commands the operation of the controllable optical disperser as needed to produce the most useful information.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 2A–2C schematically illustrate the structure and operation of an optical phased array which may be used as the controllable optical disperser, wherein FIG. 2A is a perspective view showing the general interaction of the optical phased array with a light beam, FIG. 2B is an elevational view showing the activation pattern when the optical phased array is used as a diffraction grating, and FIG. 2C is an elevational view showing the activation pattern when the optical phased array is used to control the relative dispersion of the wavelengths within individual orders;

DETAILED DESCRIPTION OF THE INVENTION

Figure 1:
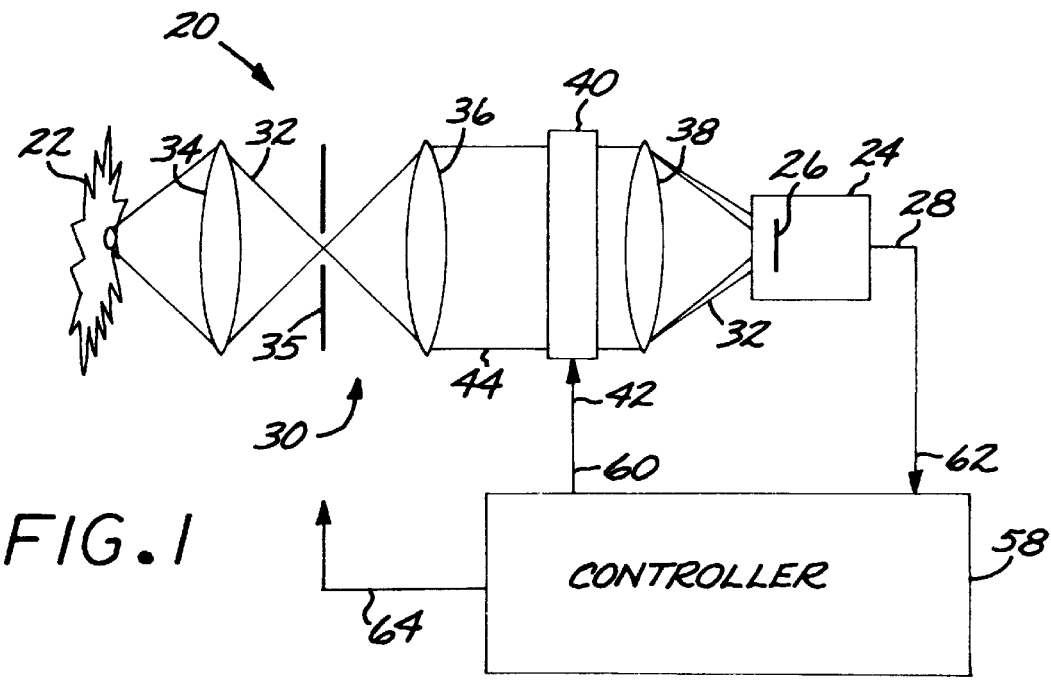
FIG. 1 is a schematic illustration of the adaptive spectral imaging device.

FIG. 1 illustrates an adaptive spectral imaging device (ASID) 20 operable to analyze a scene 22. The adaptive spectral imaging device 20 includes a detector 24, preferably including a focal plane array 26, having a detector output signal 28. The present adaptive spectral imaging device 20 preferably operates in the infrared, but could operate in other regions of the electromagnetic spectrum. Detectors 24 and their focal plane arrays 26 are known in the various wavelength ranges.

The adaptive spectral imaging device 20 further includes an optical system 30 disposed in an optical ray path 32 between the scene 22 and the detector 24. The optical system 30 images the scene 22 onto the focal plane array 26 of the detector 24. The optical system 30 may be of any operable imaging type. In the simplified representation of FIG. 1, there is an objective lens 34, a beam stop 35, a collimating lens 36, and an imaging lens 38, in order from the scene 22 to the detector 24. The optical system 30 may be supplied with other optical elements such as other lenses, controllable zoom lenses, controllable field-changing optics, mirrors, and the like. These optical elements all transmit the wavelength of interest, in this case infrared energy.

A controllable optical disperser 40 is disposed along the optical ray path 32 between the scene 22 and the detector 24. The controllable optical disperser 40 has a disperser input command signal 42. An optical disperser is a device which breaks light into its component wavelengths. Prisms and diffraction gratings are common examples of non-controllable optical dispersers that are used in optical systems, and which are not within the scope of the present invention. The present approach utilizes the controllable optical disperser 40 to controllably vary the dispersed light pattern on the focal plane array 26 responsive to the signal received on the focal plane array 26. The controllable optical disperser 40 is preferably positioned between two of the lenses of the optical system 30, in the illustrated embodiment between the collimating lens 36 and the imaging lens 38, so that the portion of the optical ray path 32 incident upon the controllable optical disperser 40 is formed of parallel optical beams.

The controllable optical disperser 40 is preferably an optical phased array that is controllable by the input command signal 42. The inventor has discovered that the one-beam or two-beam steering device(s) disclosed, for example, in U.S. Pat. Nos. 4,964,701; 5,018,835; 5,093,747; 5,126,869, and 5,963,682 may, with some modifications as discussed below, serve as an optical phased array that may be used as the controllable optical disperser 40.

Figure 2A:
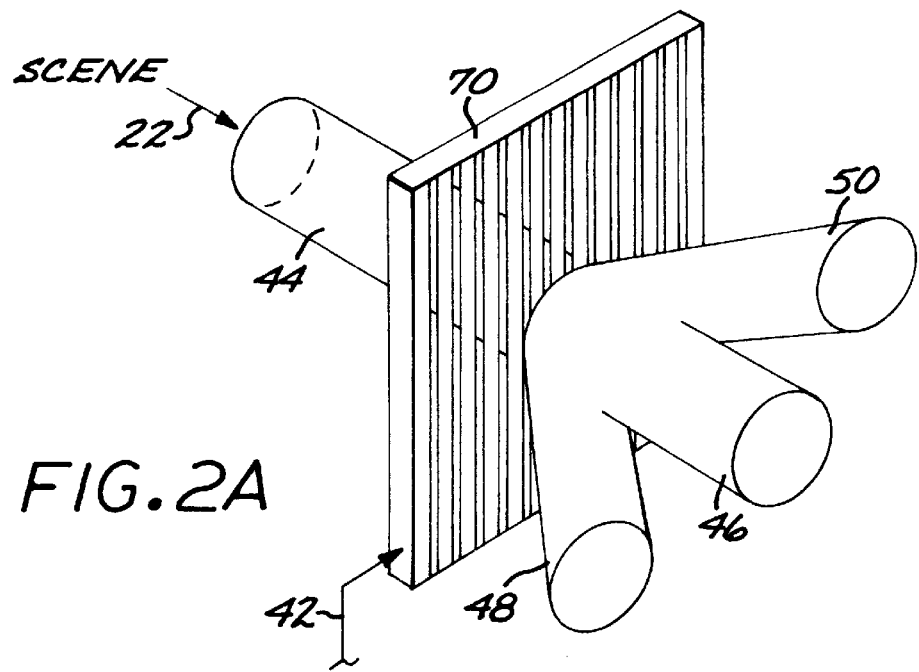
Figure 2B:
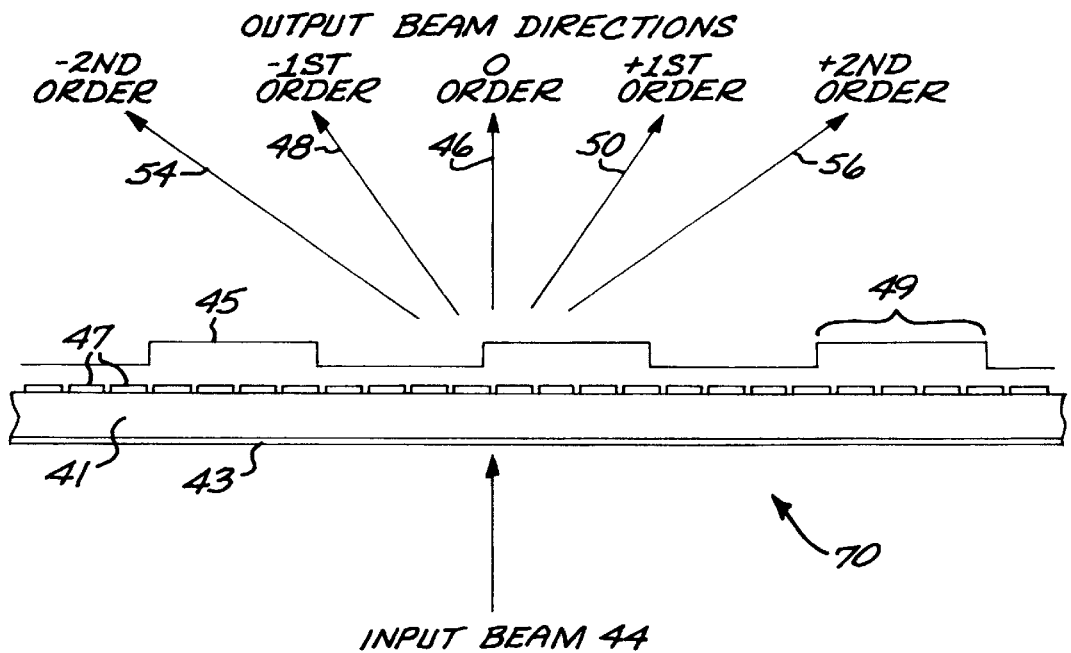
Figure 2C:
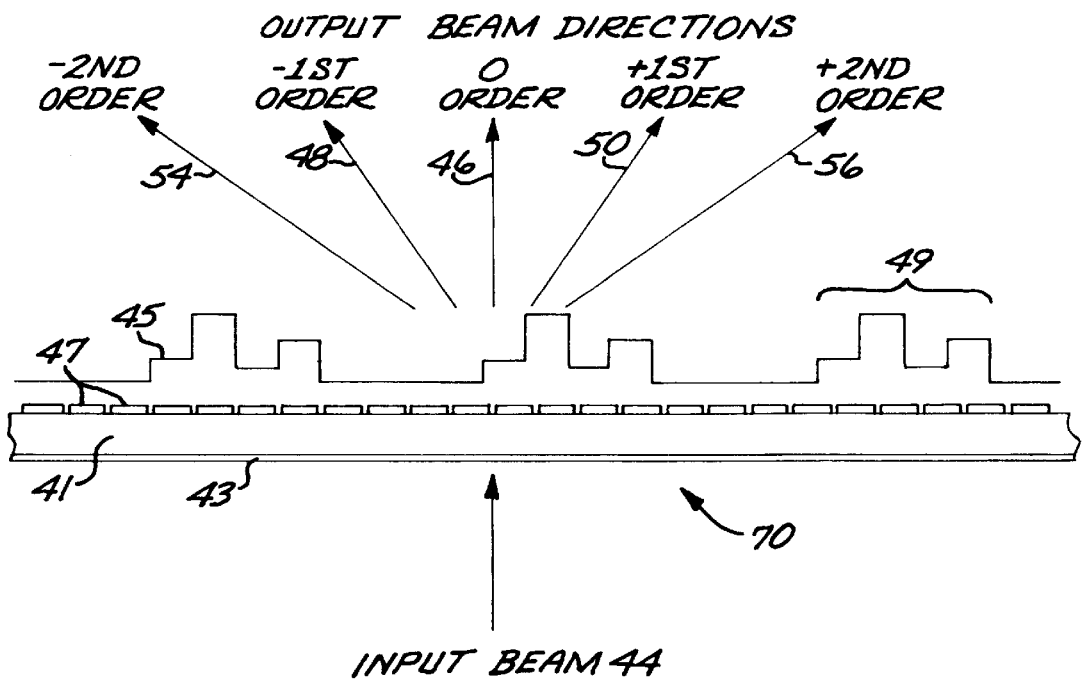

FIGS. 2A–2C schematically illustrates the structure and functioning of a beam-steering device 70 in its conventional role and in the present application. Details of the physical structure of the beam-steering device 70 may be found in the above-referenced patents. Referring to FIG. 2A, in the beam-steering device 70 an input beam 44 (which reaches the controllable optical disperser 40 from the scene 22) passes through the beam-steering device 70 as a transmitted beam 46 and two or more dispersed beams, here illustrated as two first-order dispersed beams 48 and 50. The beams 46, 48, and 50 are imaged onto the focal plane array 26. The angular orientations and the relative energies of the dispersed beams 48 and 50 may be controllably varied through the input command signal 42.

In the past, the beam-steering device 70 has been used primarily as an optical phased array to direct a beam. This beam steering is accomplished by controlling the optical phase delays through the device in a periodic manner to simulate a phase-only diffraction grating. This grating structure causes the input beam to be diffracted into three, five, or more beams, depending upon how the optical phased array is controlled. The operation of the optical phased array, when used in its conventional role as a beam-steering device, is seen in FIG. 2B. The optically active media is within a substrate 41. This media is controlled by varying amounts of voltage between individual electrodes 47 in a group 49 and a common electrode 43. As an example, all of the electrodes 47 within a group 49 may be controlled to give the square-wave output beam phase profile 45 when the input beam is a plane wave. The phase profile 45 causes the output wavefront to diffract into multiple beams or orders, each traveling in a particular direction. The angles into which the diffracted beams propagate depend upon the periodicity of the individual phase elements in the optical phased array as well as the wavelength of the incident light. In particular, longer wavelengths of light are diffracted at greater angles than shorter wavelengths.

In the present approach, the physical structure of the beam-steering device 70 is operated in a new and different manner. The beam-steering device 70 is used to control the relative dispersion of the wavelengths within individual orders. This operation may be performed as illustrated in FIG. 2C, where the square wave profile 45 of FIG. 2B has been modified to have additional electrical substructure. The voltages applied to the individual electrodes 47 are varied within each group 49 of electrodes. The resulting wavefront still has the periodicity of the square wave profile 45 of FIG. 2B, and it therefore produces a set of output beams (here illustrated as five output beams) with the same directions as those of FIG. 2B. However, the additional structure of the wavefront in FIG. 2C results in a redistribution of energy within each order. This redistribution depends upon the input wavelength spectrum. This additional level of control of the individual electrodes 47 within each of the periodic groups 49 allows the adaptive spectral imaging device 20 of the invention to control the spectral content of the detected scene imagery.

Figure 5:
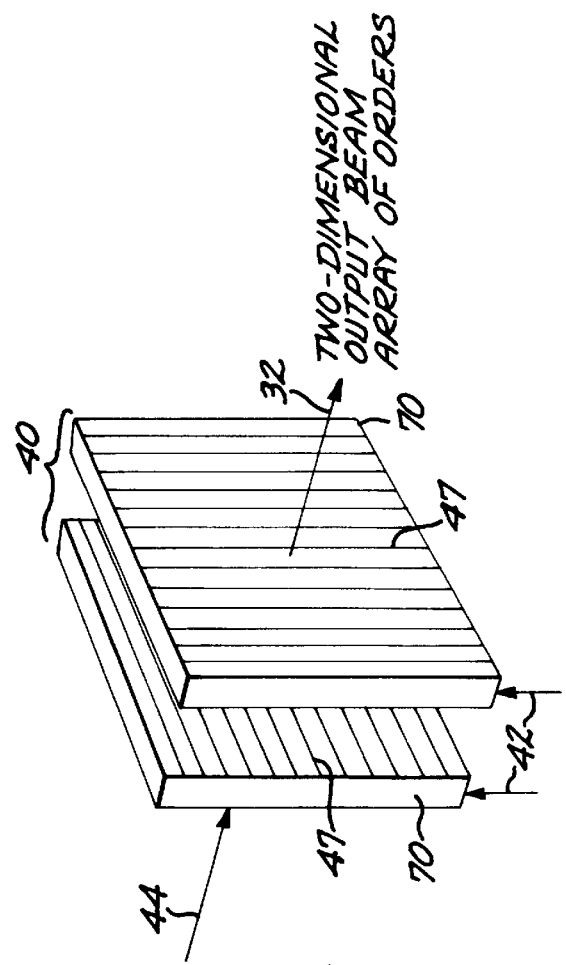
FIG. 5 is a perspective view of a two-dimensional controllable optical disperser.

The beam-steering device 70 in the form of the illustrated optical phased array, and with the altered control approach discussed in the prior paragraph, may be used as the controllable optical disperser 40. This single beam-steering device 70, illustrated in FIG. 2C, is a one-dimensional device. That is, it spreads the orders in only one dimension horizontally in the case where the grating structure is vertical. The controllable optical disperser 40 is preferably a two-dimensional device. This two-dimensional controllable optical disperser 40 is formed by placing two of the beam-steering devices 70 with the altered control approach in optical series, with one having the individual electrodes oriented vertically and one having the individual electrodes oriented horizontally, as illustrated in FIG. 5.

Figure 3:
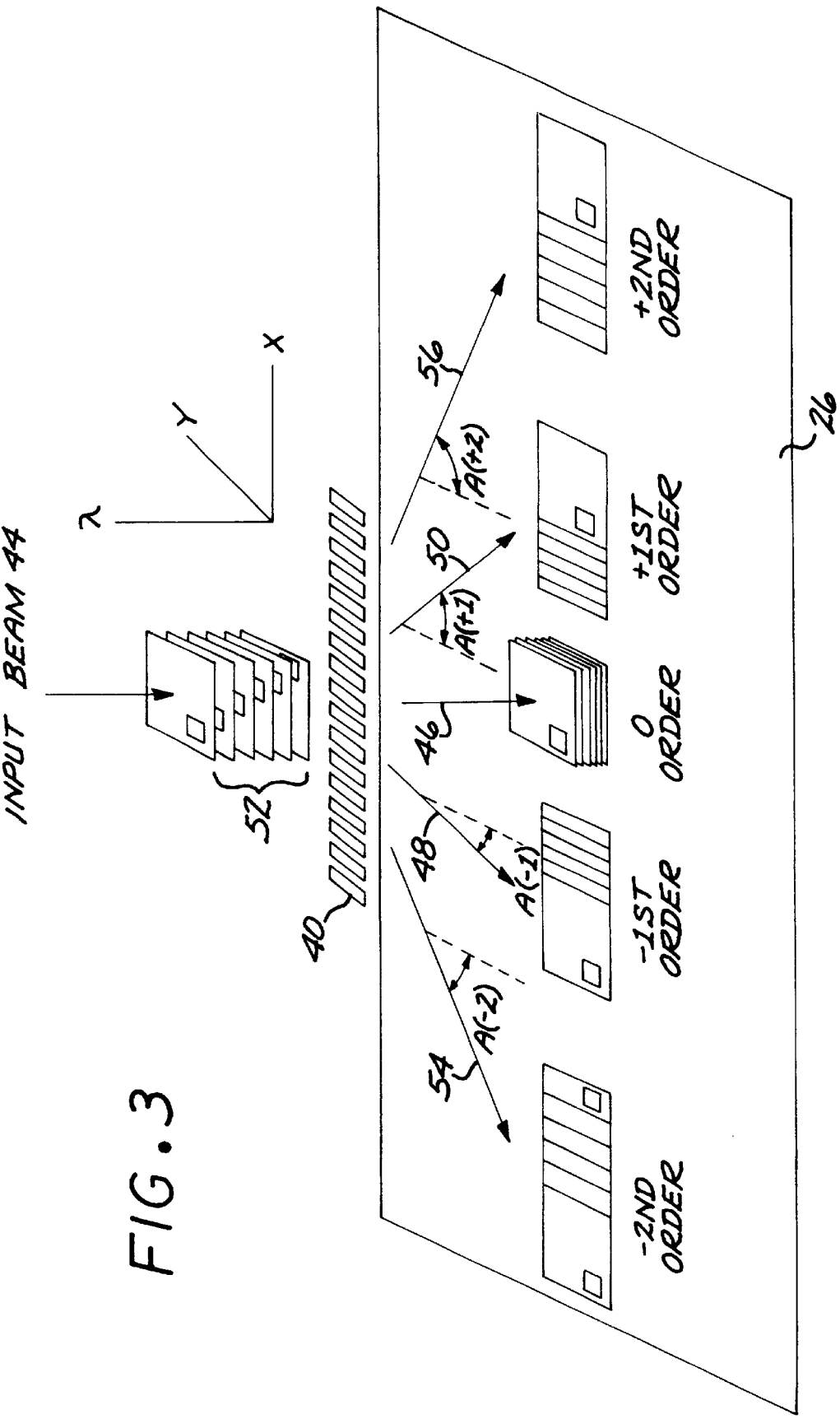
FIG. 3 is a diagrammatic illustration of the functioning of the controllable optical disperser.

FIG. 3 illustrates the use of the controllable optical disperser 40 in the present invention, omitting the elements of the optical system 30 for clarity and depicting the controllable optical disperser 40 schematically as a one-dimensional device. The input beam 44 from the scene may be schematically represented, numeral 52, as a series of x-y spatial images of different wavelengths $\lambda$. Upon encountering the controllable optical disperser 40, the energy of the input beam 44 is transmitted as the 0th order or transmitted beam 46, and two or more dispersed beams. These include the −1st order dispersed beam 48, the +1st order dispersed beam 50 and, additionally in this depiction, a −2nd order dispersed beam 54 and a +2nd order dispersed beam 56. There may be additional beams, depending upon the commands provided to the controllable optical disperser 40, including a −3rd order dispersed beam, a +3rd order dispersed beam, and so on.

In addition, the spectral energy weighting in the diffraction orders may be adjusted. As schematically illustrated, the x-y spatial images at different wavelengths $\lambda$ may be smeared out angularly according to a respective dispersion angle A(−2), A(−1), A(+1), and A(+2). This smearing and angular position of the images may be used to analyze the nature of the features in the images. For example, for an initial evaluation it may be necessary to analyze only the 0th order beam 46 and the first-order dispersed beams 48 and 50. In that case, the controllable optical disperser 40 is set so that the angles A(−2) and A(+2) of the second-order dispersed beams are off the image-detecting surface of the focal plane array 26, and only the first-order dispersed beams 48 and 50 are detected by the focal plane array 26. As a result, there is far less data to be analyzed than if the higher-order dispersed beams were detected by the focal plane array 26. For subsequent analysis it may be necessary to analyze the higher-order dispersed beams such as the dispersed beams 54 and 56, and in that event the controllable optical disperser 40 is set so that all of the beams 46, 48, 50, 54, and 56, and possibly even higher order dispersed beams, fall on the focal plane array 26.

The analysis of the output beams is preferably performed using a simultaneous analysis of spectral and spatial information. Such approaches are described, for example, in Takayuki Okamoto et al., "Simultaneous Acquisition of Spectral and Spatial Intensity Distribution," *Applied Spectroscopy*, Vol. 47, No. 8, 1993, pages 1198–1202, or Michael R. Descour et al., "Imaging spectrometer captures data in a flash," *Laser Focus World*, October 1997, pages 107–114. In these approaches, the three-dimensional x-y-$\lambda$ data array (such as depicted at numeral 52 in FIG. 3) is analyzed simultaneously using the two-dimensional focal plane array 26, as presented in FIG. 3. The available pixels of the focal plane array 26 are allocated between spatial and spectral information by the approach discussed herein, with the allocation implemented by the control of the controllable optical disperser 40 and optionally the optical system 30.

Returning to FIG. 1, a controller 58 comprises a data processor, such as a digital microprocessor. The controller 58 has a controller output signal 60 responsive to the detector output signal 28, which is provided to the controller 58 as a controller input signal 62. The controller output signal 60 is provided to the controllable optical disperser 40 as the disperser input command signal 42. That is, there is a closed-loop control path between the controllable optical disperser 40, the detector 24, and the controller 58.

The controller 58 controls the controllable optical disperser 40 according to the image output of the detector 24. Any operable procedure may be used by the controller to accomplish this control, and the procedure to be used depends upon the utilization of the adaptive spectral imaging device 20. An application of interest is the location and identification of a target feature in the scene 22, against a background of the scene 22. For this application, the controller 58 includes a calculational routine operable to distinguish a target feature against a background of the scene. Several such techniques are known in the art. A preferred calculation routine is a "whitening" routine. The "whitening" approach is discussed, for example, in Harry L. Van Trees, "Detection, Estimation, and Modulation Theory, Part I", John Wiley & Sons, New York, 1968, pages 290–297. In general, the whitening routine determines the average spectral color variation of the scene and reduces that variation. The target feature, which is assumed to have a color different from that of the background, will then have an increased contrast relative to the background and stands out from the background.

In performing the whitening analysis, the controller changes the settings of the controllable optical disperser 40 in order to reduce the information content of the scene, while enhancing the contrast between the target and its background, to produce a useful result with a minimum computational burden. The information is winnowed by using an iterative process that involves initially setting the controllable optical disperser to produce an image having low spectral and spatial resolution. Then this image is analyzed using multiresolution techniques. Multiresolution techniques are discussed, for example, in Martin Vetterli et al., "Wavelets and Subband Coding", published by Prentice-Hall PTR, Upper Saddle River, N.J., 1995, pages 214–223. Next, the controller determines the likelihood that a target exists in the scene. The controller commands the controllable optical disperser 40 to a new condition having a higher spectral and spatial resolution only in those regions of the scene where that increased resolution will enhance the target detection and identification task. This process is iteratively repeated until a target is detected or until a decision is made that a target is not present.

An example aids in illustrating this approach. A wide-angle scene is initially analyzed at a low spatial and spectral resolution. If the initial analysis indicates the possibility of a target feature in, say, the lower-right-hand quadrant of the scene, the controllable optical disperser is reset to obtain a higher spectral resolution only for the spatial region of the lower-right-hand quadrant of interest. (If the optical system 30 has a controllable optical element, such as a zoom lens or a field-changing system, the controllable optical element of the optical system 30 may also be varied in this process to focus spatially on the lower-right-hand quadrant with an optics command signal 64 produced by the controller 58, see FIG. 1.) This adaptive process may be repeated as necessary until the target feature is spatially and spectrally identified.

Figure 4:
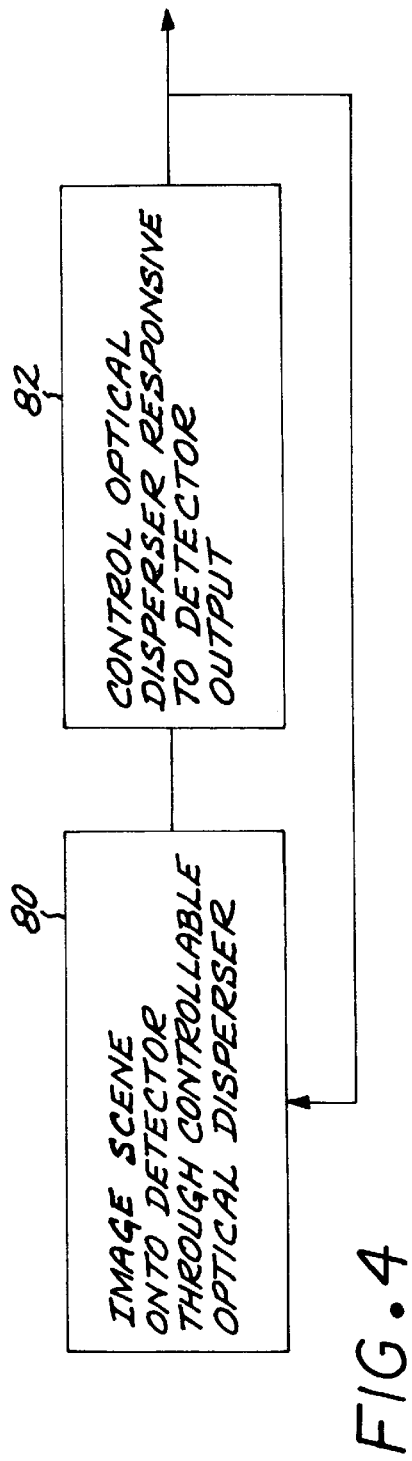
FIG. 4 is a block flow diagram of a preferred approach for practicing the invention.

FIG. 4 depicts a method for adaptively analyzing a scene using the approach just described. The scene is imaged onto a detector having a detector output signal, numeral 80. An optical ray path from the scene to the detector passes through a controllable optical disperser. The controllable optical disperser and optionally the optical system are controlled responsive to the detector output signal, numeral 82, in the manner discussed previously. The process is repeated as necessary.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An adaptive spectral imaging device operable to analyze a scene, comprising:
    a detector having a detector output signal;
    an optical system disposed in an optical ray path between the scene and the detector, the optical system imaging the scene onto the detector;
    a controllable optical disperser disposed along the optical ray path between the scene and the detector, wherein the optical dispersion of the optical disperser is controllable, the controllable optical disperse having a disperser input command signal; and
    a controller having a controller output signal responsive to the detector output signal, the controller output signal being provided to the controllable optical disperser as the disperser input command signal.

2. The adaptive spectral imaging device of claim 1, wherein the detector comprises a focal plane array.

3. The adaptive spectral imaging device of claim 1, wherein the optical system contains a first lens and a second lens.

4. The adaptive spectral imaging device of claim 3, wherein the controllable optical disperser is positioned between the first lens and the second lens.

5. The adaptive spectral imaging device of claim 1, wherein the controllable optical disperser comprises an optical phased array.

6. The adaptive spectral imaging device of claim 1, wherein the controllable optical disperser comprises a two-dimensional optical phased array.

7. The adaptive spectral imaging device of claim 1, wherein the controller includes a calculational routine operable to distinguish a target feature against a background of the scene.

8. The adaptive spectral imaging device of claim 7, wherein the calculational routine comprises a whitening routine.

9. The adaptive spectral imaging device of claim 1, wherein the optical system includes a variable optical component, and wherein the controller has a second controller output signal responsive to the detector output signal, the second controller output signal being provided to the variable optical component as a command signal.

10. An adaptive spectral imaging device operable to analyze a scene, comprising:
    a detector having a focal plane array and a detector output signal;
    an optical system disposed in an optical ray path between the scene and the detector, the optical system imaging the scene onto the focal plane array of the detector;
    a controllable optical disperser disposed along the optical ray path between the scene and the detector, the controllable optical disperser comprising an optical phased array having a disperser input command signal; and
    a controller having a controller output signal responsive to the detector output signal, the controller output signal being provided to the controllable optical disperser as the disperser input command signal, wherein the controller comprises a calculational routine operable to distinguish a target feature against a background of the scene.

11. The adaptive spectral imaging device of claim 10, wherein the controllable optical disperser comprises a two-dimensional optical phased array.

12. The adaptive spectral imaging device of claim 10, wherein the calculational routine comprises a whitening routine.

13. The adaptive spectral imaging device of claim 10, wherein the optical system includes a variable optical component, and wherein the controller has a second controller output signal responsive to the detector output signal, the second controller output signal being provided to the variable optical component as a command signal.

14. A method for adaptively analyzing a scene, comprising the steps of
    imaging a scene onto a detector having a detector output signal, a ray path from the scene to the detector passing through a controllable optical disperser, wherein the optical dispersion of the optical disperser is controllable; and
    controlling the controllable optical disperser responsive to the detector output signal.

15. The method of claim 14, wherein the detector comprises a focal plane array.

16. The method of claim 14, wherein the controllable optical disperser comprises an optical phased array.

17. The method of claim 14, wherein the step of controlling includes a step of
    performing a calculation to distinguish a target feature against a background of the scene.

18. The method of claim 17, wherein the step of performing includes a step of
    performing a whitening routine.

\* \* \* \* \*